US007440592B1

(12) United States Patent
Nimmer

(10) Patent No.: US 7,440,592 B1
(45) Date of Patent: Oct. 21, 2008

(54) SECURE CONTENT MICRODISPLAY

(75) Inventor: Mark J. Nimmer, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 739 days.

(21) Appl. No.: 10/932,975

(22) Filed: Sep. 2, 2004

(51) Int. Cl.
*G06K 9/00* (2006.01)
(52) U.S. Cl. .......................................... 382/117; 345/8
(58) Field of Classification Search ................. 382/117, 382/275
See application file for complete search history.

(56) References Cited

U.S. PATENT DOCUMENTS

| | | | | |
|---|---|---|---|---|
| 5,933,502 A * | 8/1999 | Aucsmith et al. | ............ | 382/117 |
| 5,982,555 A * | 11/1999 | Melville et al. | ............ | 359/630 |
| 6,154,321 A * | 11/2000 | Melville et al. | ............ | 359/630 |
| 6,285,505 B1 * | 9/2001 | Melville et al. | ............ | 359/630 |
| 6,369,953 B2 * | 4/2002 | Melville et al. | ............ | 359/630 |
| 6,560,028 B2 * | 5/2003 | Melville et al. | ............ | 359/630 |
| 6,735,328 B1 * | 5/2004 | Helbing et al. | ............ | 382/117 |
| 6,824,281 B2 * | 11/2004 | Schofield et al. | ............ | 359/876 |
| 6,873,743 B2 * | 3/2005 | Steinberg | ............ | 382/275 |
| 6,879,443 B2 * | 4/2005 | Spitzer et al. | ............ | 345/8 |
| 6,926,727 B2 * | 8/2005 | Schachar et al. | ............ | 606/166 |
| 2001/0026632 A1 * | 10/2001 | Tamai | ............ | 382/117 |
| 2001/0043402 A1 * | 11/2001 | Melville et al. | ............ | 359/630 |
| 2002/0097498 A1 * | 7/2002 | Melville et al. | ............ | 359/630 |
| 2005/0146487 A1 * | 7/2005 | Travers et al. | ............ | 345/8 |

* cited by examiner

*Primary Examiner*—Matthew C. Bella
*Assistant Examiner*—Sath V. Perungavoor
(74) *Attorney, Agent, or Firm*—Nathan O. Jensen

(57) ABSTRACT

A secure content near eye display apparatus includes a microdisplay device. A user verification system of the secure content near eye display apparatus is configured to verify whether a user is an authorized user. A controller coupled to the microdisplay device and to the user verification system controls the microdisplay device to display secure content information to the user only if the user verification system has verified that the user is the authorized user. In some embodiments, a display-eye interface detector is included in the secure content near eye display apparatus to detect when the display-eye interface is broken. In response, the controller controls the microdisplay device to stop displaying the secure content information.

9 Claims, 6 Drawing Sheets

SECURE CONTENT MICRODISPLAY

FIELD OF THE INVENTION

The present invention relates generally to microdisplay devices. More particularly, the invention relates to limiting viewing of secure content on microdisplay devices to authorized users.

BACKGROUND OF THE INVENTION

For many reasons, displayed information content may be personal, confidential, or otherwise in need of security. With the large increase of information distribution systems in private, commercial or other use, the integrity of information is more prone to comprise. For example, with mobile phones, automated financial machines and a variety of handheld electronic devices, the information displayed can be observed by individuals, groups or other unauthorized personnel. This fact compromises privacy and/or security. There is a need for the ability to limit information to only those individuals that should have access to it, while maintaining the ability to provide that content in very public or even hostile environments.

Microdisplays based upon organic light emitting diode (OLED), liquid crystal display (LCD), cathode ray tube (CRT), and other technologies have been used to provide near eye information content for a variety of applications. In the usual configuration, the operator looks into a lens array at a large virtual image of a microdisplay. There is usually a flexible shroud around the eye area to limit outside lighting from reducing the display contrast.

While the use of an eye shroud with microdisplay devices can limit access to information and content to only a single user at any given time, it does not prevent unauthorized users from viewing that information content on the microdisplay device. In an example situation, a stolen cellular phone having a microdisplay attachment and memory for storing financial or personal records would give an unauthorized user access to those financial or personal records. Numerous such examples are possible in which an unauthorized user can gain access to secure content information if the unauthorized user gains access to a microdisplay device.

Embodiments of the present invention provides solutions to these and/or other problems, and offer other advantages over the prior art.

SUMMARY OF THE INVENTION

A secure content near eye display apparatus includes a microdisplay device. A user verification system of the secure content near eye display apparatus is configured to verify whether a user is an authorized user. A controller coupled to the microdisplay device and to the user verification system controls the microdisplay device to display secure content information to the user only if the user verification system has verified that the user is the authorized user. In some embodiments, a display-eye interface detector is included in the secure content near eye display apparatus to detect when the display-eye interface is broken. In response, the controller controls the microdisplay device to stop displaying the secure content information.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
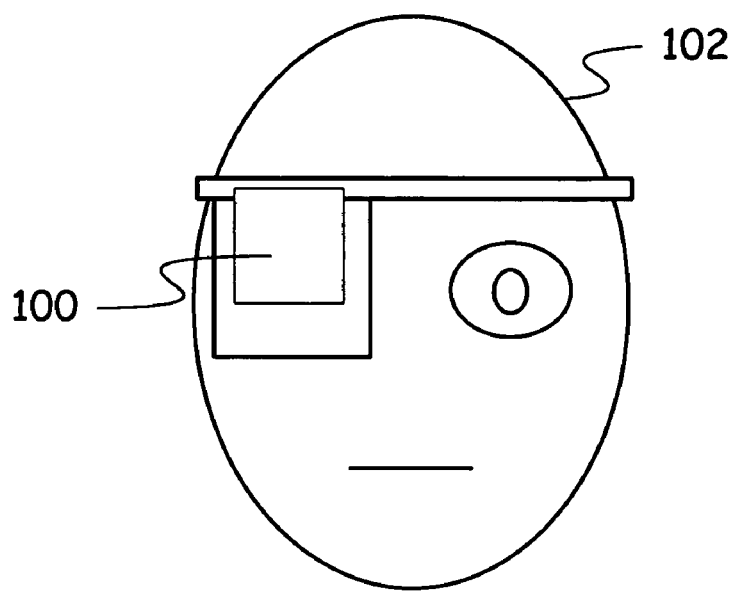
FIG. 1 is a diagrammatic illustration of a head mounted or eye worn microdisplay device being viewed by a user.

FIG. 1 is a diagrammatic illustration of a secure content near eye display apparatus 100 worn by a user 102. In this embodiment, the near eye display apparatus is an eye worn or head mounted microdisplay apparatus. In accordance with embodiments of the invention described below in greater detail, the secure content near eye display apparatus 100 includes a user verification system configured to verify whether a user is an authorized user. The user verification system can be, for example, an eye scanner configured to verify whether the user is the authorized user by scanning the user's eye once a display-eye interface is established. The eye scanner can be a retina scanner or an iris scanner. A controller of the display apparatus 100 controls the microdisplay device to display secure content information to user 102 only if the user verification system has verified that the user is the authorized user.

Figure 2:
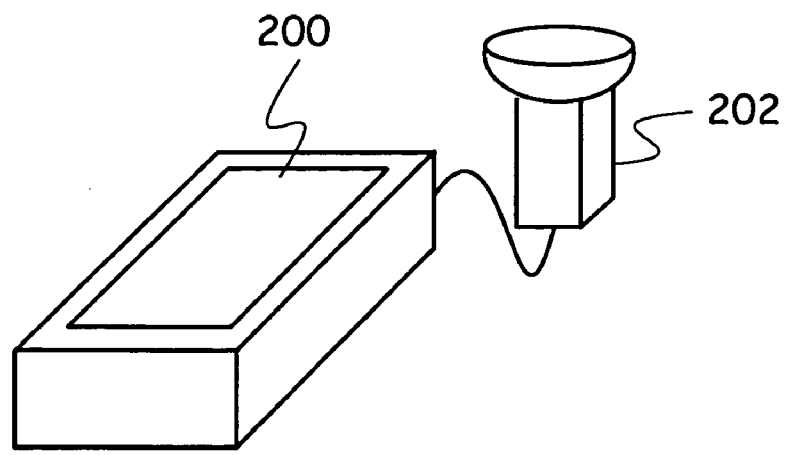
FIG. 2 is a diagrammatic illustration of an electronic device, such as a mobile telephone or a personal digital assistant (PDA), having a microdisplay device attachment for viewing by a user.

Another example of a secure content near eye display apparatus is shown in FIG. 2. FIG. 2 illustrates a personal electronic device 200 such as a personal digital assistant (PDA) or a cell phone. Personal electronic device 200 includes a microdisplay attachment 202. Like display apparatus 100 shown in FIG. 1, microdisplay attachment 202 and personal electronic device 200 implement a user verification system to verify whether a user is an authorized user prior to displaying secure content information on the microdisplay attachment 202. The secure content near eye displays illustrated in FIGS. 1 and 2 are merely examples of near eye display apparatus in which the present invention can be implemented.

Figure 3:
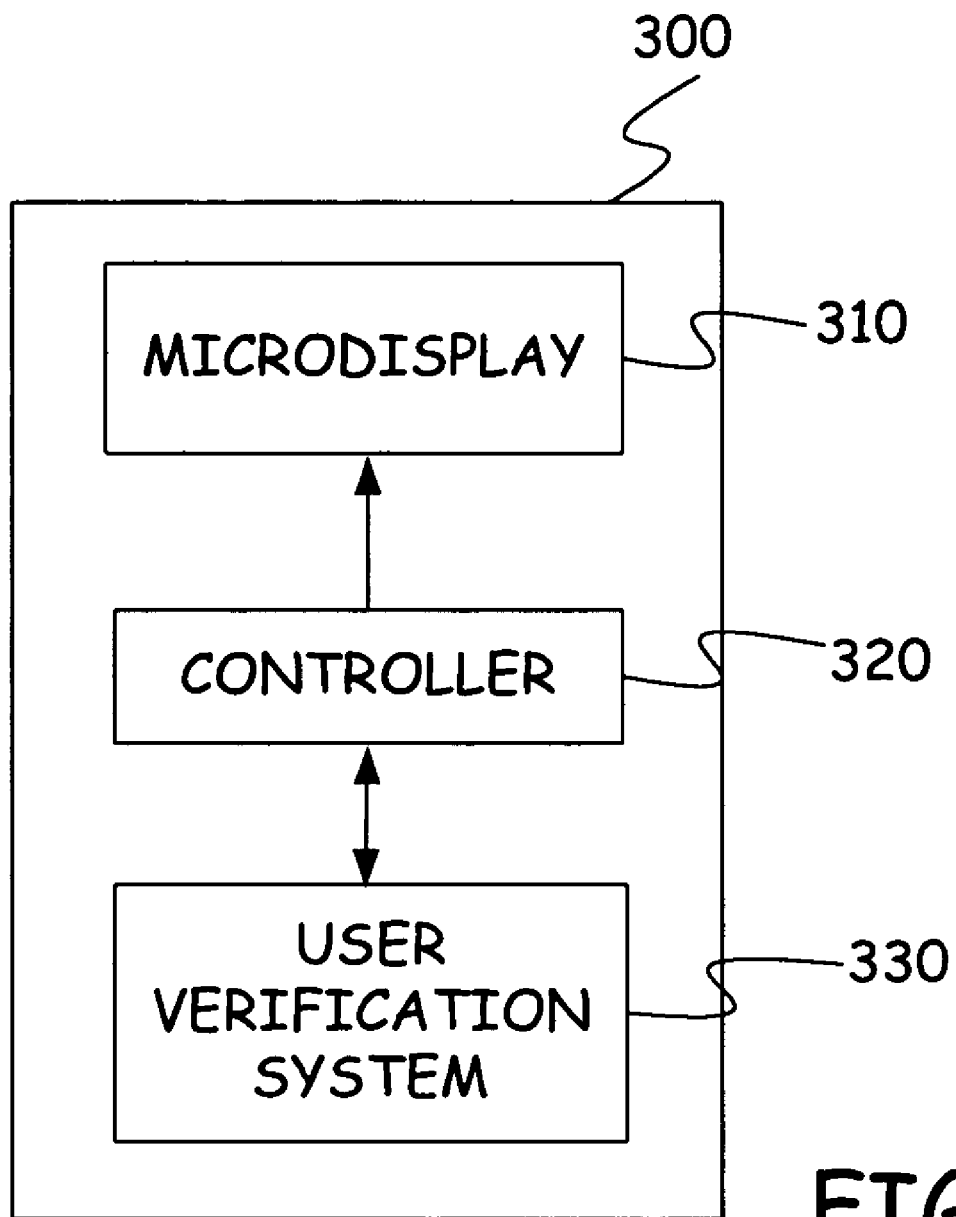
FIG. 3 is a block diagram illustrating an embodiment of a secure content near eye display apparatus in accordance with the present invention.

FIG. 3 is a block diagram illustrating a secure content near eye display apparatus 300 which can be embodied in devices such as those shown in FIGS. 1 and 2. As described, display apparatus 300 includes a microdisplay device 310, a controller 320 and a user verification system 330. Microdisplay 310 can be a microdisplay device based on organic light emitting diode (OLED), liquid crystal display (LCD), cathode ray tube (CRT), or other technologies used to provide near eye information content to a user. User verification system 330 is configured to verify whether a user of apparatus 300 is an authorized user allowed to view secure content information. As will be described below in greater detail, user verification system 330 includes, in some embodiments, an infrared (IR) or optical retina or iris scanner within near eye display apparatus 300. Controller 320 is coupled to user verification systems 330 and microdisplay device 310, and is configured to control the microdisplay device to display secure content information to the user only if the user verification system 330 has verified that the user is an authorized user.

Figure 4:
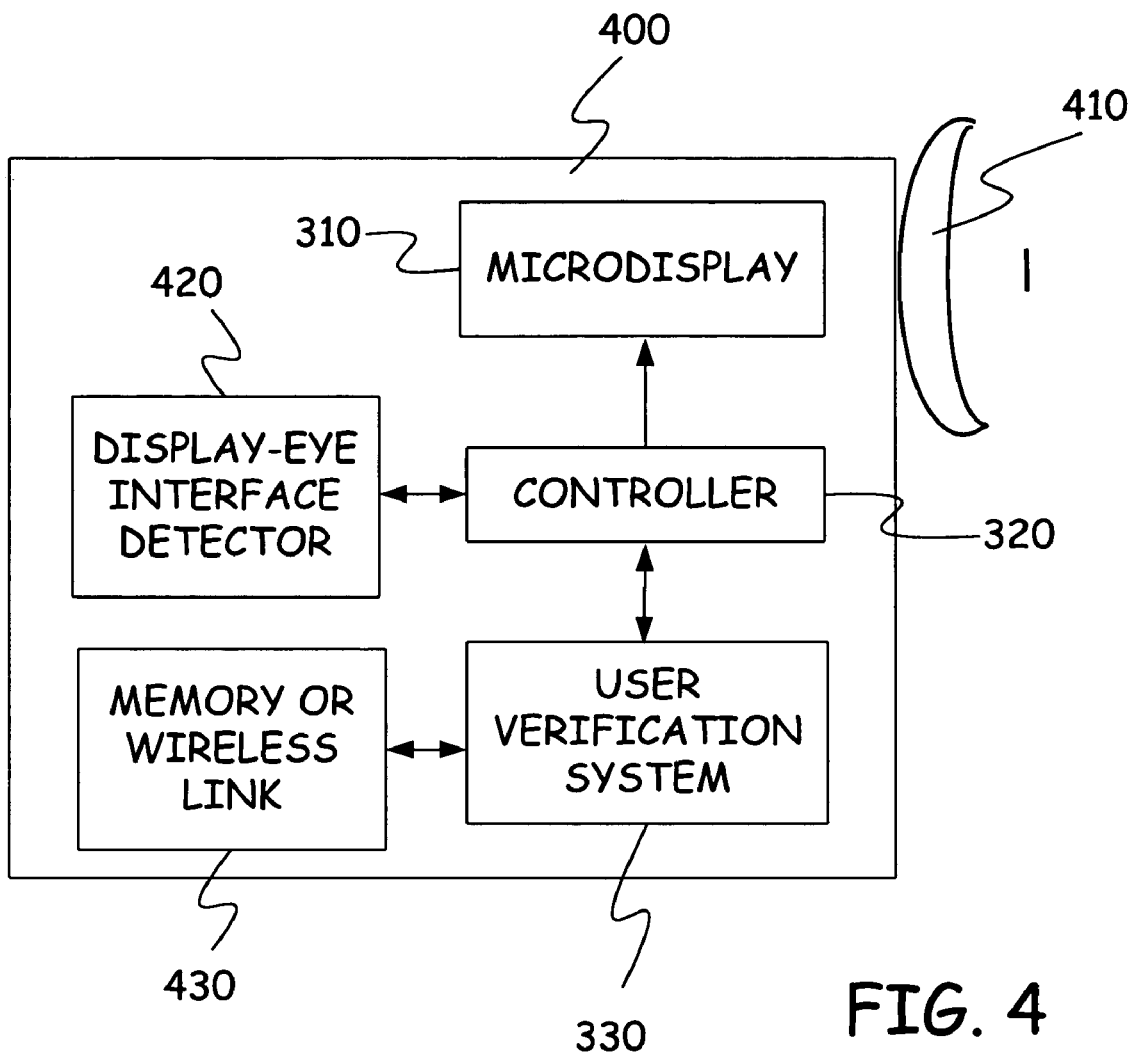
FIG. 4 is a block diagram illustrating a more particular embodiment of a secure content near eye display apparatus in accordance with the present invention.

FIG. 4 is a block diagram which diagrammatically illustrates in greater detail an embodiment of a secure content near eye display apparatus 400 of the present invention. Secure content near eye display apparatus 400 includes, in addition to the components illustrated in FIG. 3, a display-eye interface detector 420. Display-eye interface detector 420 when the display-eye interface between the user and the secure content near eye display apparatus is broken. For example, microdisplay devices commonly include an eye shroud 410 through which a display-eye interface can be established. Typically, eye shroud 410 will be made of a flexible material (e.g., rubber or synthetic), and will be of a size and shape to surround the eye area to limit lighting from reducing the display contrast. The display-eye interface established between a user and secure content near eye display apparatus 400 can be considered to be a display-eye interface between microdisplay 310 and the user, or between the shroud and the user.

The display-eye interface detector 420 is coupled to controller 320 and provides an indication to the controller of when the display-eye interface has been broken. Once the user has been authenticated as an authorized user by user verification system 330, controller 320 only allows the secured content information to be displayed on microdisplay 310 until display-eye interface detector 420 detects that the display-eye interface has been broken. Display-eye interface detector 420 can be implemented in a wide variety of different embodiments. For example, display-eye interface detector 420 can include a pressure sensor which detects a change in pressure near eye shroud 410 as the user removes his or her eye from the area adjacent the eye shroud to break the display-eye interface. Use of a pressure sensor to detect a slight vacuum or pressure difference is particularly useful in embodiments in which shroud 410 forms a seal with the user's face surrounding his or her eye. In another embodiment, display-eye interface detector 420 includes an infrared sensor configured to detect external modulated IR signals reflected off of the face of the user after the user removes his or her eye from the area adjacent eye shroud 410 to break the display-eye interface. Alternatively, if the retina or iris scan provided by user verification system 330 is non-disruptive (i.e., is infrared, not visible), user verification system 330 can provide the functions of display-eye interface detector 420 by continuously authenticating the user to limit data access.

Another feature of embodiments of the present invention illustrated in FIG. 4 relates to user verification system 330. In embodiments in which user verification system 330 includes an eye scanner, the iris or retina patterns of authorized users can be stored in a secure tamper resistant memory device. In the alternative, the authentication can be accomplished using a secure wireless link to an external system which stores the iris or retina patterns. In FIG. 4, the secure tamper resistant memory and/or the secure wireless link are illustrated at 430. Although the secure tamper resistant memory and/or the secure wireless link used by user verification system 330 is only illustrated in FIG. 4, such a feature can be included in each of the embodiments illustrated in the various FIGS.

Figure 5:
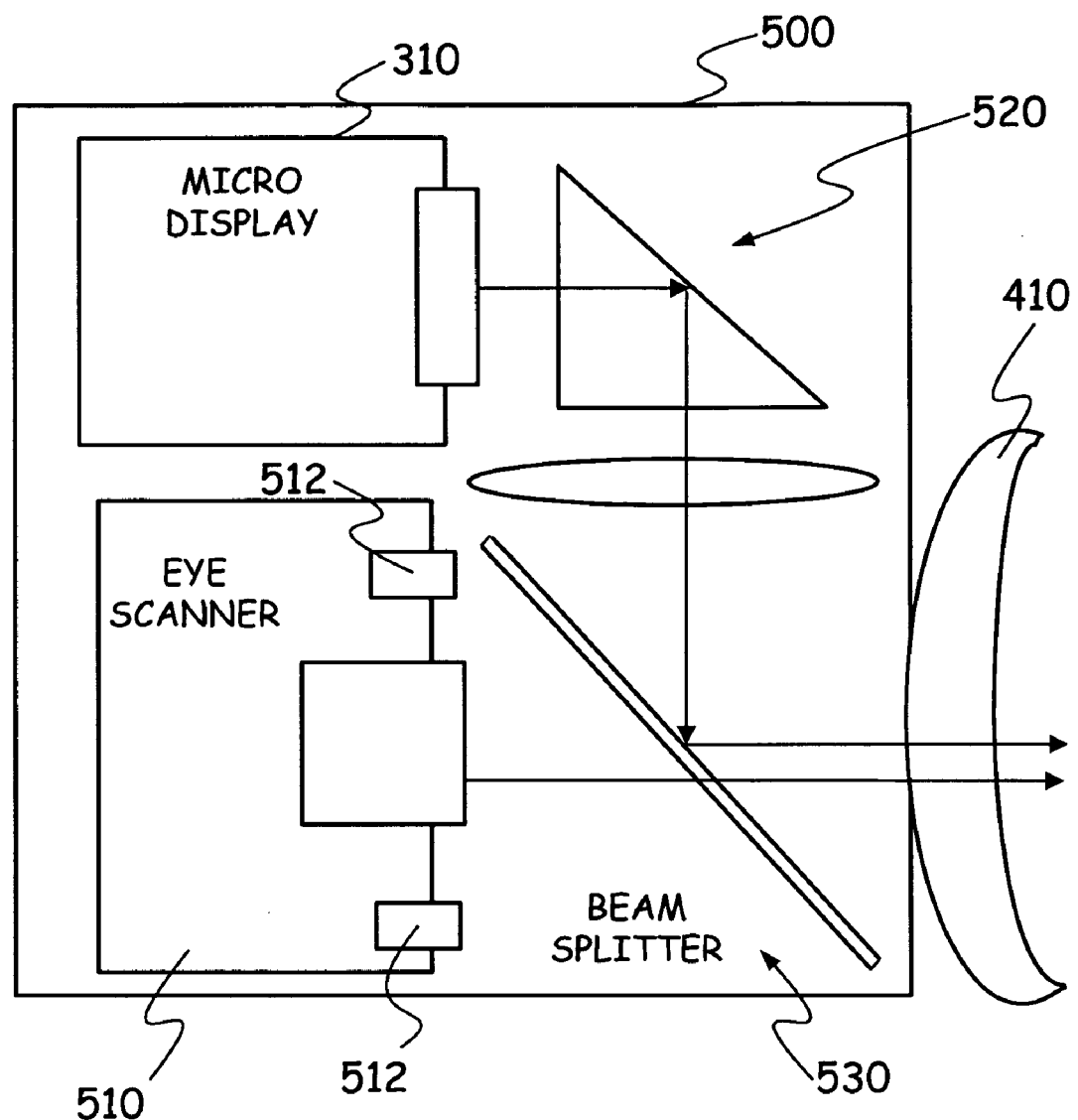
FIG. 5 is a diagrammatic illustration of a more particular embodiment of a secure content near-eye display apparatus in accordance with embodiments of the present invention.

FIG. 5 is a diagrammatic illustration of a secure content near eye display apparatus 500 in accordance with some embodiments of the present invention. Display apparatus 500 can be a particular implementation of display apparatus 300 and 400 shown in FIG. 4. As shown in FIG. 5, user verification system 330 includes eye scanner 510 as described above. Eye scanner 510 includes infrared (IR) illuminators 512 which generate IR light. After the user establishes a display-eye interface using shroud 410, the user looks into a lens array 520 at a large virtual image of microdisplay 310. The two systems, the microdisplay 310 and the eye scanner 512, are implemented coaxially using a beam splitter 530.

In the illustrated embodiment, the IR illumination used by eye scanner 512 passes through beam splitter 530 toward shroud 410 and the eye of the user. Light from microdisplay 310 and lens array 520 is reflected off of beam splitter 530 toward shroud 410 and the eye of the user. However, in other embodiments, the position of microdisplay 310 and eye scanner 510 relative to beam splitter 530 can be reversed such that the light from microdisplay 310 and lens array 520 passes through beam splitter 530, etc.

Figure 6:
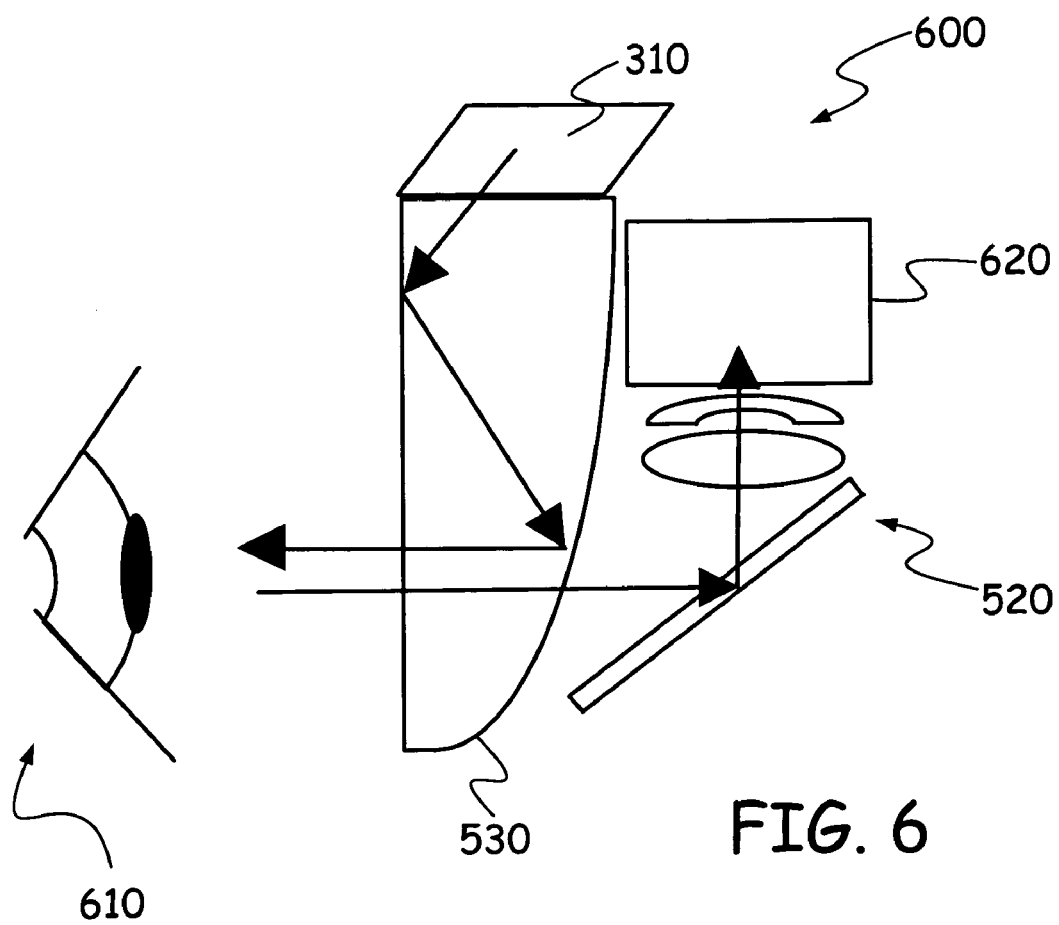
FIG. 6 is a diagrammatic illustration components of a secure content near eye display apparatus in accordance with some embodiments of the present invention.

FIG. 6 is a diagrammatic illustration of portions of a secure content near eye display apparatus 600 in accordance with some embodiments of the present invention. Display apparatus 600 can be a particular implementation of any of the previously described display apparatus embodiments. FIG. 6 does not, however, illustrate all of the previously described features. As shown in FIG. 6, an eye 610 of a user is positioned relative to beam splitter 530 such that it is interfaced by both microdisplay 310 and a camera 620. Camera 620 is one particular embodiment of eye scanner 510 or user verification system 330. Camera 620 can include, for example, an array of charge coupled devices (CCDs) such as are common in digital cameras. Camera 620 would also include associated electronics for performing the user verification and authentication functions. As shown in FIG. 6, in this particular embodiment, IR light used by camera 620 or other user verification systems passes through beam splitter 530 and is directed accordingly by lens array 520. Light from microdisplay 310 is reflected by beam splitter 530 toward the eye 610 of the user.

Figure 7:
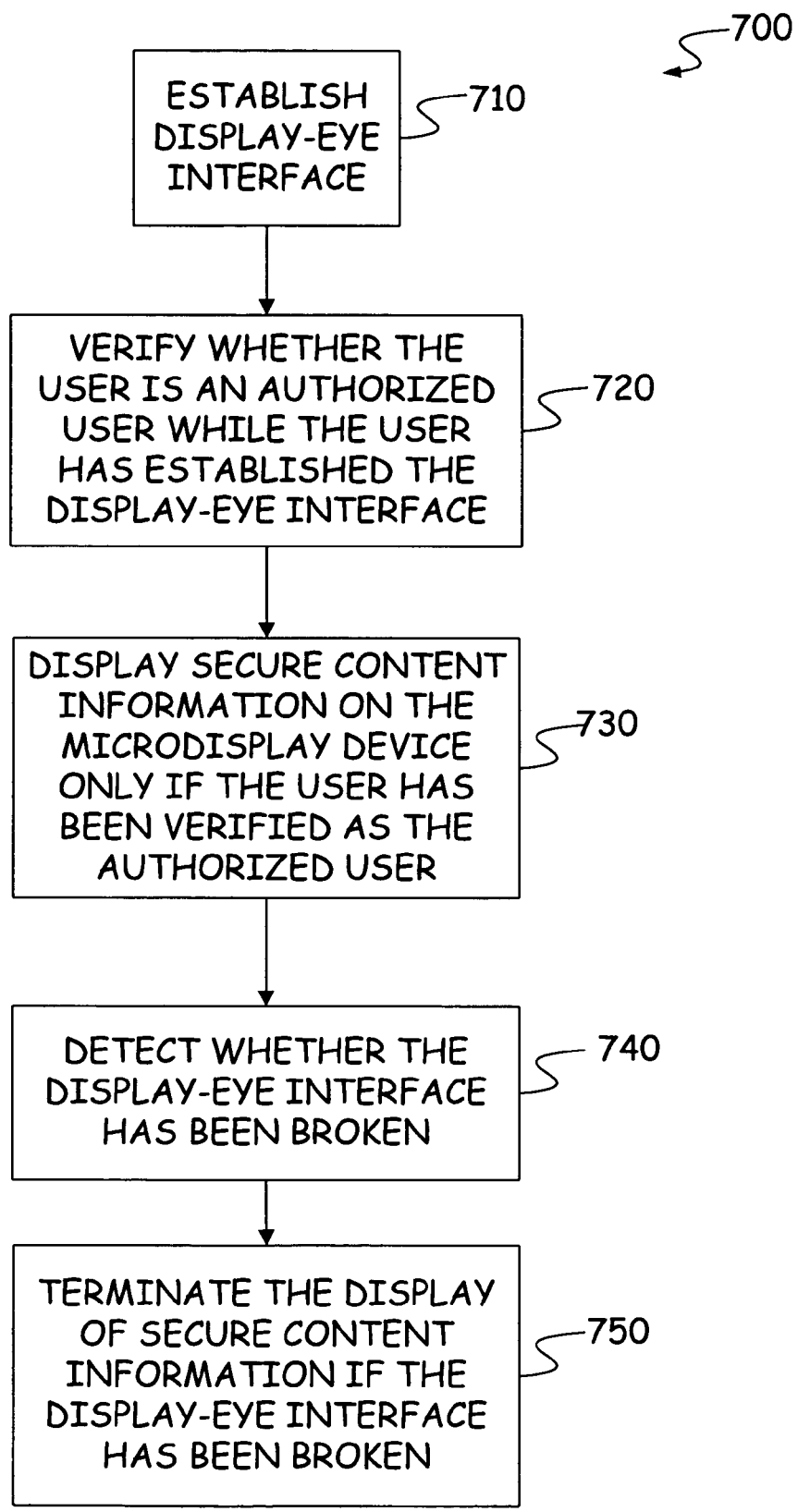
FIG. 7 is a flow diagram illustrating steps of a method of the present invention.

FIG. 7 is a flow diagram 700 illustrating embodiments of methods of the present invention. As shown at 710, the methods of the present invention include establishing a display-eye interface with a secure content near eye display apparatus. As described above, the secure content near eye display apparatus will typically include a microdisplay device. Next, as shown at 720, the method includes verifying whether the user is a authorized user while the user has established the display-eye interface. Finally, as shown at 730, the method includes displaying secure content information on the microdisplay device only if the user has been verified as the authorized user. In some embodiments, the methods of the present invention include the further steps illustrated at 740 and 750. These steps include detecting whether the display-eye interface has been broken, and terminating the display of secure content information if the display-eye interface has been broken.

The secure content display apparatus and methods of the present invention can be used to provide secure operation of automobiles, aircraft, thermal/night vision equipment, cameras, weapons, portable computers, etc. The devices can be used to restrict access to personal, financial information, as well as secure property from theft or unauthorized operation. In general, using the methods and apparatus of the present invention, any type of information can be displayed in a public or compromisable environment, without allowing it to be viewed by unauthorized persons.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the secure content microdisplay apparatus, while maintaining substantially the same functionality without departing from the scope and spirit of the present invention.

What is claimed is:

1. A secure content near eye display apparatus comprising:
    a microdisplay device;
    an eye shroud, the user placing his or her eye adjacent to the eye shroud to establish a display-eye interface to view the secure content information;
    a user verification system configured to verify whether the user is an authorized user, wherein the user verification system includes an eye scanner configured to verify whether the user is the authorized user by scanning the user's eye once the display-eye interface is established between the user's eye and the microdisplay device;
    a beam splitter arranged to allow the eye scanner to function coaxially with the microdisplay device such that the eye scanner verifies whether the user is the authorized user while the user views the microdisplay device after the display-eye interface is established;
    a controller coupled to the microdisplay device and to the user verification system, the controller being configured to control the microdisplay device to display secure content information to the user only if the user verification system has verified that the user is the authorized user; and
    wherein the eye scanner is a non-disruptive eye scanner and is configured to continuously verify whether the user is the authorized user while the user views the microdisplay device after the display-eye interface is established, and wherein the controller is configured to control the microdisplay device to stop displaying the secure content information if the eye scanner is unable to verify that the user is the authorized user, thereby indicating that the display-eye interface is broken.

2. The secure content near eye display apparatus of claim 1, wherein the eye scanner is a retina scanner.

3. The secure content near eye display apparatus of claim 1, wherein the eye scanner is an iris scanner.

4. The secure content near eye display apparatus of claim 1, and further comprising a display-eye interface detector which detects when the display-eye interface between the user and the eye shroud is broken, wherein the controller is configured to control the microdisplay device to stop displaying the secure content information when the display-eye interface detector detects that the display-eye interface is broken.

5. The secure content near eye display apparatus of claim 4, wherein the display-eye interface detector comprises a pressure sensor which detects a change in pressure as the user removes his or her eye from the area adjacent the eye shroud to break the display-eye interface.

6. The secure content near eye display apparatus of claim 4, wherein the display-eye interface detector comprises an infrared sensor configured to detect external modulated infrared signals reflected off of the face of the user after the user removes his or her eye from the area adjacent the eye shroud to break the display-eye interface.

7. A secure content near eye display apparatus comprising:
    a microdisplay device;
    an eye shroud against which a user places his or her eye to establish a display-eye interface with the microdisplay device;
    a user verification system configured to verify whether the user is an authorized user after the user has established the display-eye interface, wherein the user verification system includes an eye scanner configured to verify whether the user is the authorized user by scanning the user's eye once the display-eye interface is established;
    a beam splitter arranged to allow the eye scanner to function coaxially with the microdisplay device such that the eye scanner verifies whether the user is the authorized user while the user's eye is placed against the eye shroud to view the microdisplay device after the display-eye interface is established;
    a display-eye interface detector which detects when the display-eye interface between the user and the secure content near eye display apparatus is broken, wherein the display-eye interface detector comprises a pressure sensor which detects a change in pressure as the user removes his or her eye from the area adjacent the eye shroud to break the display-eye interface; and
    a controller coupled to the microdisplay device, to the user verification system, and to the display-eye interface detector, the controller being configured to control the microdisplay device to display secure content information to the user only if the user verification system has verified that the user is the authorized user, and only if the display-eye interface detector has not detected that the display-eye interface has been broken.

8. The secure content near eye display apparatus of claim 7, wherein the display-eye interface detector comprises an infrared sensor configured to detect external modulated infrared signals reflected off of the face of the user as the user breaks the display-eye interface.

9. The secure content near eye display apparatus of claim 7, wherein the microdisplay device generates display images, the apparatus further comprising a lens array disposed and arranged to generate larger virtual images of the display images generated by the microdisplay device.

* * * * *